Jan. 4, 1966   F. N. PLATT   3,227,998
AUTOMOBILE DRIVER ATTENTION INDICATOR
Filed May 7, 1962   3 Sheets-Sheet 1

FLETCHER N. PLATT
INVENTOR
BY John R. Faulkner
Keith L. Zerschling
ATTORNEYS

Jan. 4, 1966 F. N. PLATT 3,227,998
AUTOMOBILE DRIVER ATTENTION INDICATOR
Filed May 7, 1962 3 Sheets-Sheet 3

United States Patent Office 3,227,998
Patented Jan. 4, 1966

3,227,998
AUTOMOBILE DRIVER ATTENTION INDICATOR
Fletcher N. Platt, Ann Arbor, Mich., assignor to Ford Motor Company, Dearborn, Mich., a corporation of Delaware
Filed May 7, 1962, Ser. No. 192,657
14 Claims. (Cl. 340—54)

This invention relates to a safety and training device for an automotive vehicle.

For the past few years, as a result of the many lives lost and the great amount of property destroyed by automobile accidents, there has been an upsurge in research relating to driver habits and qualifications. Part of this research has been directed towards uncovering some index or classification of driver characteristics that relates to accident experience. This index might be measured and indicated while driving and thereby inform the driver whether or not he is driving normally or abnormally. An abnormal rating would indicate that the driver is in danger of having an accident.

After attempting many different approaches to the above problem, the applicant while studying one theory of accident prediction fortuitously discovered that a driver will make steering wheel reversals at a fairly constant rate under a wide variety of traffic and highway conditions and that each driver has a basic rate of steering wheel reversals. Following this discovery, the applicant conducted many tests which verified his theory. In addition to verifying his basic theory, applicant has determined that if the driver is going too fast for the existing traffic or road conditions, his reversal rate will increase substantially; and if the driver begins to relax, daydream, doze, or sleep, the reversal rate will decrease substantially. Such circumstances as the width of the road, rain, cross winds, traffic density, lighting conditions, and the tension of the driver affect the driver's reversal rate and the reversal rate will rise if he drives too fast in view of these conditions.

On the basis of the above-stated principles, the applicant has developed a device that computes the rate of steering wheel reversals or adjustments and provides the driver with continuous information regarding his rate. The invention also provides a means for setting each driver's normal reversal range into the device and generating a warning signal when his reversal rate substantially varies from his normal reversal rate. This warning indicates when the operator is driving abnormally, that is either he is driving too fast for the existing conditions or his reactions are slowing down appreciably. For example, as the driver is lulled to sleep by the monotony of an expressway, his rate will fall, but before he can fall asleep, the invention will sound a buzzer and prevent him from losing control of the car, thus perhaps saving his life.

Other devices have been invented to test the operator's alertness, but the one hereinafter described in detail provides an early warning of drowsiness, a warning when the operator is driving too fast for the existing conditions, and a continuous indication of whether or not an operator is driving normally.

It is the general object of this invention to provide a safety device for an automotive vehicle;

Another object of this invention is the provision of an instrument which will indicate whether or not the driver is driving according to his normal habits;

Another object of the invention is the provision of a safety device which will provide an early warning to the operator that he is becoming drowsy;

Another object of the invention is the provision of an instrument which will warn the operator whether or not he is driving too fast for the existing road conditions;

Other objects and advantages of the invention will become apparent as the detailed written description is considered in conjunction with the drawings wherein.

The basic concept of the invention is to measure the small corrective adjustments of the steering wheel that the operator causes in maintaining the vehicle along a selected path and comparing the rate of these adjustments to the operator's normal rate of adjustment. One of the units for measuring these adjustments is a reversal which is defined as a steering wheel adjustment to the left or right followed by an adjustment in the opposite direction. The preferred embodiment is constructed to sense every steering wheel reversal which is greater than one and one-half degrees. It is within the scope of the invention to utilize steering wheel reversal rates of a lesser or greater magnitude which count every half reversal or to utilize different basic units of steering wheel adjustments.

Figure 1:
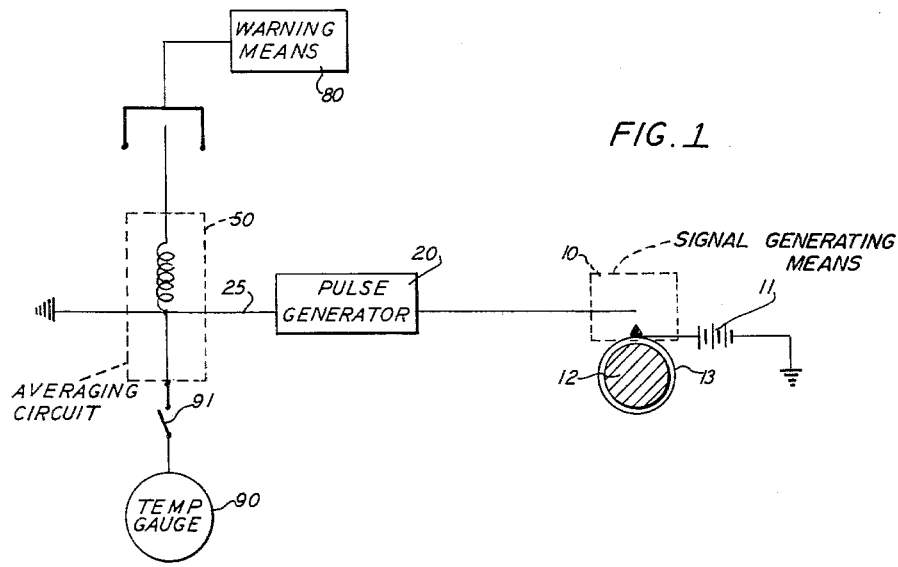
FIGURE 1 is a schematic diagram of the safety and training device.

Referring to FIGURE 1, the invention in general comprises the signal generating means or switching circuit 10 which is connected in circuit to a voltage supply such as the battery 11. The switching circuit 10 is actuated by the vehicle steering member 12 which carries an actuating means 13. The actuation of the switching circuit 10 by the actuating means 13 causes a voltage to be applied by the battery 11 to the pulse generator 20 which is connected in circuit with the switching circuit 10. The voltage applied by the battery 11 triggers the pulse generator 20 causing a constant width pulse to be generated and transmitted via the conductor 25 to the averaging or rate circuit 50. The rate circuit 50 generates a signal which is proportional to the rate at which the pulse generator 20 transmits signals and is operatively coupled to an instantaneous reading means or a temperature gauge 90. When the rate transmitted by the pulse generator 20 reaches a selected minimum or maximum value, the signal generated by the rate circuit 50 will cause the warning means 80 to generate a perceptible signal. The warning means 80 may cause a signal in the form of an audible noise, a visible light, a vibration or any other equivalent warning signal. The temperature gauge 90 is coupled to the rate circuit 50 via a switch 91 which may be actuated manually by the operator of the automotive vehicle when a visual calibrated reading of the rate is desired.

In operation, each time the vehicle steering member 12 experiences a reversal, the switching circuit 10 will be actuated and a voltage will be applied to the pulse generator 20 which in turn causes a constant width pulse to be generated and transmitted to the averaging circuit 50. The averaging circuit 50 will in turn cause a signal to be generated that is proportional to the rate at which pulses are transmitted by the pulse generator 20. The rate of the pulse generator 20 is in turn proportional to the rate of steering wheel reversals. When the signal caused by the rate circuit 50 exceeds or drops below the selected minimum or maximum values, the warning means 80 will manifest a signal which is perceptible to the driver of the automotive vehicle.

Figure 2:
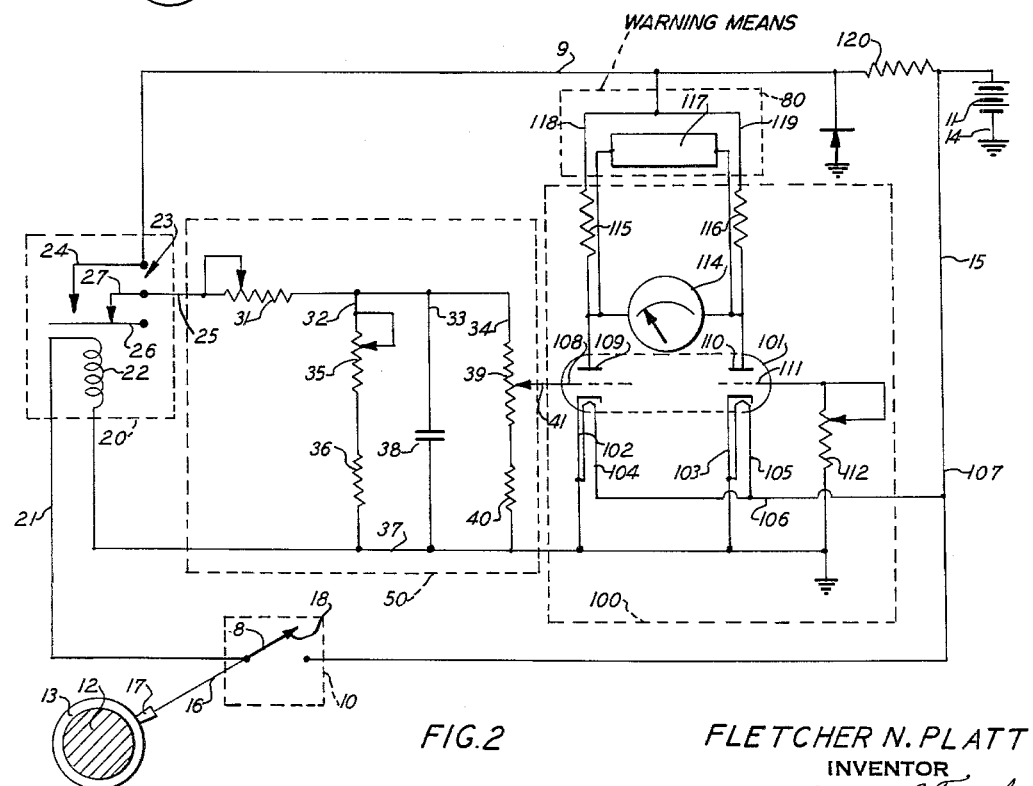
FIGURE 2 is a detail schematic diagram of the one embodiment of the invention.

In FIGURE 2, a specific embodiment of the invention is disclosed which will accomplish the functions set forth in conjunction with the explanation of the schematic diagram depicted in FIGURE 1. The preferred embodiment shown in FIGURE 2 includes a voltage supply 11 which is connected to ground via the conductor 14 and to the switching circuit 10 via the conductor 15. The switching circuit 10 comprises a switch 8 having an actuating finger or member 16 that includes a felt-tip member 17 which rides on the periphery of a metallic ring that constitutes the actuating means 13. The actuating finger 16 is connected to rotate the contact 18 of the switch 8. The ring 13 is rigidly fixed to the vehicle steering member 12 which is utilized to steer the automotive vehicle. The movement of the vehicle steering member 12 in a counterclockwise direction will cause a friction force between ring 13 and the felt-tip member 17 which moves the felt-tip member 17 in a clockwise direction thereby moving the actuating finger 16 and causing the contact 18 of the switch 8 to close. The subsequent reversal of the vehicle steering member will cause the felt-tip member 17 to rotate in a counterclockwise direction and thereby move the actuating finger 16 to cause the contact 18 of the switch 8 to open. It should be noted that the rotation of the vehicle steering member 12 in a counterclockwise direction caused the switch 8 to close while the rotation of the vehicle steering member in a clockwise direction opened the switch 8. Thus two adjustments of the steering wheel 12 (one to the left and one to the right) are necessary to close the switch 8 once. A switch arrangement to close each time the steering wheel is adjusted to the left or the right is a readily constructed expedient within the scope of the invention.

The switching circuit 10 is connected by a conductor 21 to the pulse generator 20. The pulse generator 20 includes a relay coil 22 which is operatively coupled to the make-break switch 23. Make-break switch 23 includes the normally open contact 24, the conductor 26 and the normally closed contact 27 which is connected to the conductor 25. The application of a voltage to the relay coil 22 causes the contact 24 to abut the conductor 26 and thereby complete a circuit from the contact 24 through the conductor 26 through the contact 27. This circuit will be maintained for a substantially constant time period until the contact 27 is opened by the voltage applied to the relay coil 22. The continued application of voltage to the relay coil 22 after the make-break action has been effected has no effect upon the switch 23. Typical make-break switch arrangements are discussed in the book "The Design of Switching Circuits" by Keister, Ritchie, and Washburn, published by D. Von Nostrand Co., Inc., 1951, pages 12–23.

The pulse caused by the pulse generator 20 is transmitted to the averaging circuit 50 by the conductor 25. The conductor 25 is in circuit with a charging resistor 31 which may take the form of a variable resistor. The charging resistor 31 is connected to three parallel circuit branches 32, 33, and 34. The circuit branch 32 has a variable resistor 35 connected in circuit with a limit resistor 36. The limit resistor 36 in turn is connected to a ground terminal 37. The circuit branch 33 has a capacitor 38 which is connected to the ground terminal 37. The variable resistor 39 and the resistor 40 form the circuit branch 34 and are also connected to the ground terminal 37. The variable resistor 39 has an output lead 41 which is connected to the grid of a triode in the measuring circuit 100.

In operation, a pulse received by the conductor 25 will cause the capacitor 38 to charge which is controlled in part by the setting of charging resistor 31. During the period which the conductor 25 is not receiving pulses, the capacitor 38 will discharge through the variable resistors 35 and 39. The discharge through the variable resistor 39 will cause a signal voltage to be placed on the conductor 41. This signal voltage is proportional to the rate at which pulses are received by the conductor 25 which in turn is proportional to the reversal rate of the steering wheel.

The measuring circuit 100 takes the form of a bridge or a vacuum tube voltmeter in the preferred embodiment. The vacuum voltmeter type of circuit has been selected in the preferred embodiment in order to provide the added sensitivity which is inherent in this instrument as contrasted with the ordinary voltmeter. It should be understood, however, that an ordinary voltmeter may be used or any other ordinary visual indicating means that manifests a visual signal when a voltage is applied. The particular circuit utilized in the preferred embodiment is analyzed in the book "Electronic Circuits" by E. J. Angelo, published by the McGraw-Hill Publishing Company, 1958, first edition, on pages 286–287.

The measuring circuit 100 includes a twin triode 101 which has cathodes 102 and 103 connected to the ground terminal 37. The associated heater circuits 104 and 105 are connected by the conductors 106 and 107 to the battery 11. The grid 108 which controls the current which flows between the cathode 102 and the plate 109 is connected to the variable resistor 39 via the conductor 41. The current which flows between the cathode 103 and the plate 110 is controlled by the grid 111 which is connected to a variable resistor 112. The cathode 103 and its associated grid circuitry, including the variable resistor 112, functions as a fine zero adjustment for the bridge circuit. The resistor 112 is adjusted so that the equivalent resistance of the right side and the left side of the triode are equal when the voltage applied to the conductor 41 is zero. The plates 109 and 110 have an ammeter 114 connected between them and are in series with resistors 115 and 116 respectively. The resistors 115 and 116 have a warning means 117 connected across them and are both connected via the conductors 118 and 119 and the resistor 120 to the battery terminal 9.

The application of a voltage to the conductor 41 will cause an unbalance between the left and the right side of the triode 101. This in turn will cause a current to flow through the ammeter 114 which will indicate the voltage applied to the conductor 41. This voltage is representative of the rate of steering wheel reversal. The unbalance in the left side of the twin triode 101 will also cause a voltage differential to exist across the warning means 117. When this voltage difference reaches a selected level, the warning means 117 will generate a signal which is readily perceptible to the operator of the automotive vehicle.

In summary, the actuating means 13 of the vehicle steering member 12 operates the switching circuit 10 by closing the contact 18 when a steering wheel reversal is transmitted through the felt-tip member 17 and the actuating finger 16. The closing of the contacts 18 causes a voltage to be applied to the relay coil 22 which in turn actuates the make-break relay 23 causing the contact 24 to close. This momentarily completes a circuit through the contact 27 which subsequently opens, breaking this circuit. The action of the make-break circuit causes a pulse to be transmitted to the conductor 25 which in turn causes the capacitor 38 to charge and subsequently discharge through the circuit branches 32 and 34. The voltage applied to these circuit branches will be proportional to the rate at which the capacitor 38 receives pulses via the conductor 25. The voltage applied by the capacitor 38 to the variable resistor 39 results in an unbalance of the twin triode 101. The unbalance of the twin triode 101 causes a current to flow through the ammeter 114 thereby giving a visual indication of the voltage stored by the capacitor 38 which in turn is proportional to the rate of steering wheel reversal. When this voltage reaches a selected level, the warning means 117 will generate an audible or visual signal.

Figure 3:
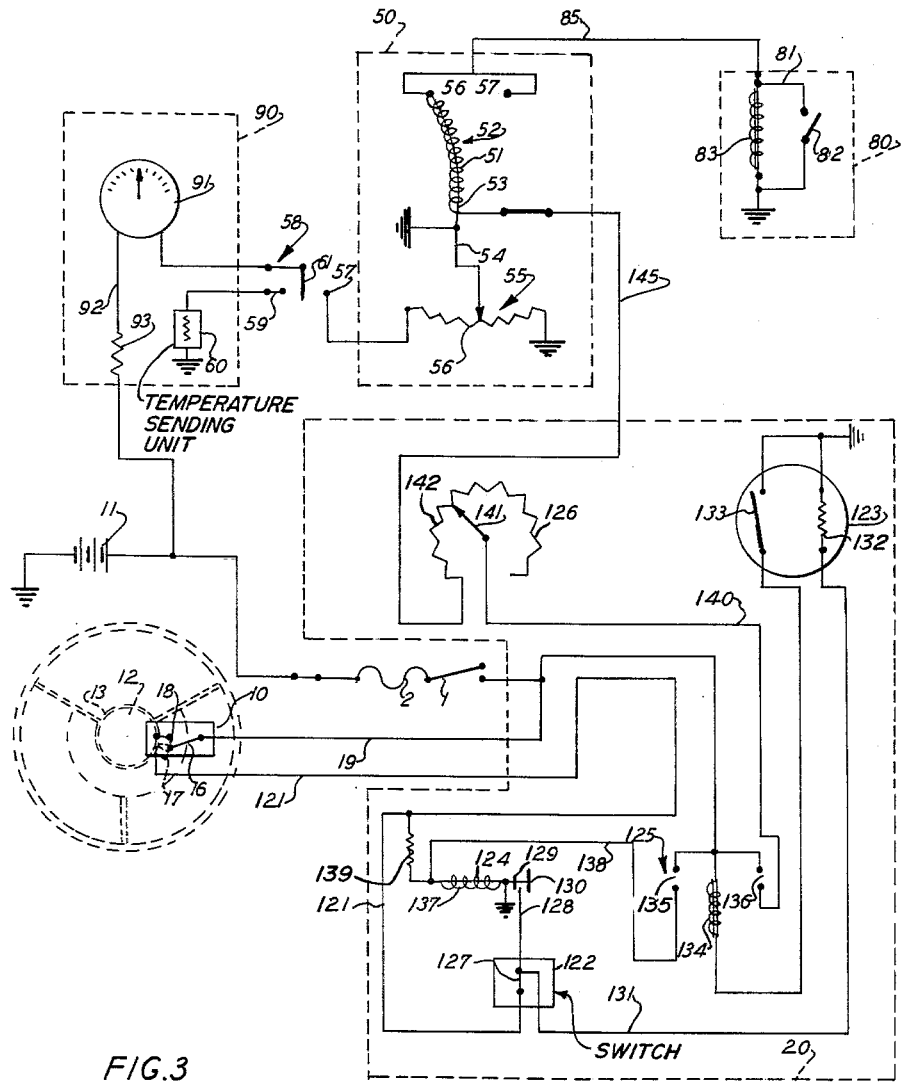
FIGURE 3 is a detail schematic diagram of an alternate embodiment of the invention.

An alternate embodiment of the instant invention is shown in FIGURE 3. This embodiment utilizes electrical components as contrasted with the electronic components utilized in the preferred embodiment. The switching circuit 10 of this embodiment is operated in virtually the identical manner as described in conjunction with FIGURE 2. The switching circuit 10 has a felt-tip member 17 which is in contact with an actuating means 13 fixed to the vehicle steering member 12. The reversal of movement of the vehicle steering member will cause the felt-tip member 17 to actuate to move the actuating finger 16 to close or open the contacts 18 dependent on the nature of the reversal. The switching circuit 10 is connected to the battery 11 by the conductor 19 which includes a manually operated switch 1 and a fuse 2.

A conductor 121 connects the switching circuit 10 to the pulse generator circuit 20. The pulse generator circuit 20 comprises a switch 122 (shown in the closed position), a time-delay relay 123, a holding relay 124, a double-pole relay 125, and a potentiometer 126. The conductor 121 is connected to the normally closed contact 127 of switch 122 which has an extension 128 interposed between the abutments 129 and 130 of the holding relay 124. The normally closed contact 127 is connected by conductor 131 to the heater resistor 132 of the time-delay relay 123. The time delay 123 may be any of the well-known electrical time-delay relays of the bimetal type such as is disclosed in "How to Choose a Timer," Product Engineering, February 19, 1962, pages 96–105. This relay has a normally open set of contacts 133 (one of the contacts being supported on a bimetal arm) which will close, after a given time delay, when a voltage is applied to the heater resistor 132. The contacts will remain closed as long as the resistor 132 remains energized and will open after a given time delay when the resistor 132 is de-energized. The normally open contacts 133 are connected to the relay coil 134 of the double-pole relay 125. The double-pole relay 125 has normally open contacts 135 and 136 which are controlled by the relay coil 134. The normally open contacts 135 are connected to the coil 137 of the holding relay 124 via the conductor 138. The relay coil 137 is also connected to a resistor 139 which is in turn connected to the conductor 121. The holding relay 124 is controlled by the relay coil 137 which will actuate the extension 128 to open the normally closed contacts 127 when energized. The normally open contacts 136 of the double-pole relay 134 are connected to the potentiometer 126 via the conductor 140. The potentiometer 126 has an arm 141 which is connected to the conductor 140 and which rides on the resistor portion 142 which is in turn connected to the averaging circuit 50 by a conductor 145.

In operation, the pulse generator circuit 20 will cause a substantially constant width and constant amplitude pulse to be transmitted to the averaging circuit 50 each time the vehicle steering member 12 experiences a steering wheel reversal. This is accomplished by closing the switch 1 by operating a manual control which is placed on the dashboard of the automotive vehicle. The switching circuit 10 is now in condition to be actuated by the steering reversals of vehicle steering member 12. A steering wheel reversal will cause the felt-tip member 17 to close the contacts 18, thus supplying a voltage to the conductor 121 which in turn applies a voltage to the resistor 132 of the time-delay relay 123 via the normally closed contact 127 and the conductor 131. The application of a voltage to the time-delay relay 123 will cause the normally open contacts 133 to close for a fixed interval. The closing of the contacts 133 completes a circuit from the battery 11 to the relay coil 134 of the double-pole relay 125. The energization of the relay coil 134 closes the normally open contacts 135 which in turn complete a circuit from the battery 11 through the normally open contacts 135 to the relay coil 137 of the holding relay 124. The energization of the relay coil 137 causes the abutment members 129 and 130 to actuate the extension 128, thereby opening the normally closed contact 127. It should be noted that as long as the switch 1 and the contacts 18 remain closed, a voltage will be supplied to the resistor 139 and the coil 137. The current caused by this voltage is not sufficient to actuate the relay coil 137, but once the relay coil 137 is energized by the closing of the double-pole relay 125, this voltage will be sufficient to maintain the holding relay in a position which maintains the contact 127 in open relationship. The opening of the contact 127 terminates the voltage across the resistor 132 of the time-delay relay 123, and the contacts 133 will open after a given time delay. This permits the time-delay relay 123 to function as the controlling element in the circuit regardless of the length of time that the contacts 18 of the switching circuit 10 may be closed. The closing of the contacts 133 of the time-delay relay 123 will also cause the relay coil 134 to close the normally open contact 136 and to supply a voltage to the potentiometer arm 141 and in turn to the conductor 145 which is connected to the averaging circuit 50. The voltage will be applied to the potentiometer arm 141 and to the averaging circuit 50 for a selected period which is determined by the time it takes for the contacts 133 to open after the resistor 132 has been de-energized. When the contacts 133 of the time-delay relay 123 open, the relay coil 134 is de-energized, thereby opening the contacts 135 and 136 and terminating the supply of voltage to the conductor 140 and the potentiometer arm 141. It should be noted that the opening of the contact 135 will not affect the actuation of the holding relay 124 so long as the switch 1 and the contacts 18 remain closed. Maintaining the holding relay in the actuated position causes the contacts 27 to remain open and to prevent a single steering wheel reversal from causing more than one pulse.

The conductor 145 which couples the pulse generator circuit 20 to the averaging or rate circuit 50 is connected to coil 51 of the bimetal heater 52. The coil 51 surrounds a bimetallic element 53 which is connected to pivot an arm 54 of the potentiometer 55. The bimetal element 53 moves between the contacts 56 and 57 which are connected by the conductor 85 to the buzzer or warning means 80. The warning means has a conductor 81 having normally closed contacts 82 connected across the relay coil 83. The conductor 81 and the normally closed contacts 82 form a short circuit around the relay coil 83 which actuates the buzzer or warning means 80, thereby preventing the manifestation of a warning signal when closed.

The potentiometer 55 has a resistor portion 56 which is connected to the contact 57 of the double-pole switch 58. The double-pole switch 58 has a contact 59 which is connected to the temperature sending unit 60 of the automotive vehicle. The double-pole switch 58 also has a switch arm 61 which may be manually moved between the contacts 57 and 59 and which is connected to the measuring circuit 90. The measuring circuit 90 includes measuring instrument 91 which may be an ammeter which ordinarily functions as a temperature gauge. The ammeter is connected to the battery 11 by the conductor 92 which includes a limiting resistor 93.

In operation, the averaging circuit 50 receives a pulse from the pulse generator circuit 20 which is transmitted to the heater coil 51. The energization of the heater coil 51 causes the bimetal element 53 to move between the contacts 56 and 57 and also causes the arm 54 to be positioned along the resistor 56 of the potentiometer 55. If the operator of the automotive vehicle desires a visual indication of his steering wheel reversal rate, the double-pole switch 58 may be manually operated so that the arm 61 is connected to the contact 57. This results in a circuit being completed from the battery 11 through the conductor 92, the ammeter 91, the arm 61, contact 57, the resistor portion 56 of the potentiometer 55, and the arm 54 to ground. If the operator of the vehicle desires an audible or other readily perceptible signal to be generated, the switch 82 connected across the coil 83 may be opened. The opening of the switch 82 will enable the coil 83 to be energized when the bimetal element 51 abuts either of the contacts 56 or 57. The contacts 56 and 57 are positioned so that a selected deflection of the bimetal element 53 will cause the coil 83 to be energized. It should be noted that the bimetal element 53 is normally positioned adjacent the contact 56 and two or three pulses will be required to move the bimetal element away from the contact 56. For this reason it is preferable not to actuate the switch 82 until the averaging circuit has had time to warm up. It also should be understood that the deflection of the bimetal element 83 is proportional to the rate at which pulses are delivered by the pulse generator circuit 20 to the heating coil 51.

In summary, the embodiment of the invention shown in FIGURE 3 operates in a manner quite similar to the embodiment shown in FIGURE 2. The change in direction of movement of the vehicle steering member 12 may cause the felt-tip member 17 which rides along the actuating means 13 to close the contacts 18 which energize the time-delay relay 23 to enable a substantially constant width pulse to be transmitted via the conductor 140 and the adjustable potentiometer 126 to the averaging circuit 50. It should be noted that the amplitude of the pulse may be varied by the adjustment of the arm 141 of the potentiometer 126. The pulse transmitted to averaging circuit 50 will energize and warm the heater coil 51 which will in turn cause the bimetal element 53 to be deflected between the contacts 56 and 57. The movement of the bimetal element 53 also causes the arm 54 of the potentiometer 55 to be moved along the resistor portion 56 of the potentiometer. The measuring circuit 90 provides the operator with a continuous representation of his steering wheel reversal rate if he so desires. When the operator desires such a continuous representation, he may manually operate the double-pole switch 58 to connect the arm 61 with the contact 57 to complete the circuit from the battery 11 through the ammeter 91 to the resistor portion 56 to ground. In addition to a continuous representation of the operator's steering wheel reversal rate, the operator may desire a warning signal to emanate when a selected minimum or maximum steering wheel reversal rate is reached. For this purpose, contacts 56 and 57 are provided and when the selected minimum or maximum steering wheel reversal rate is realized, the bimetal element 53 will abut the contacts 56 and 57 causing the warning means 80 to be operated.

The embodiments described above and shown in FIGURES 2 and 3 have been presented in order to emphasize the breadth of applicant's invention. The essence of applicant's invention is shown in FIGURE 1 and any fluid, mechanical, electrical, or electronic equivalent may be employed in applicant's invention. Utilization of hydraulic, pneumatic, or purely mechanical systems may be designed by one of ordinary skill when following the teaching which the applicant has disclosed in the above detailed description.

Figure 4:
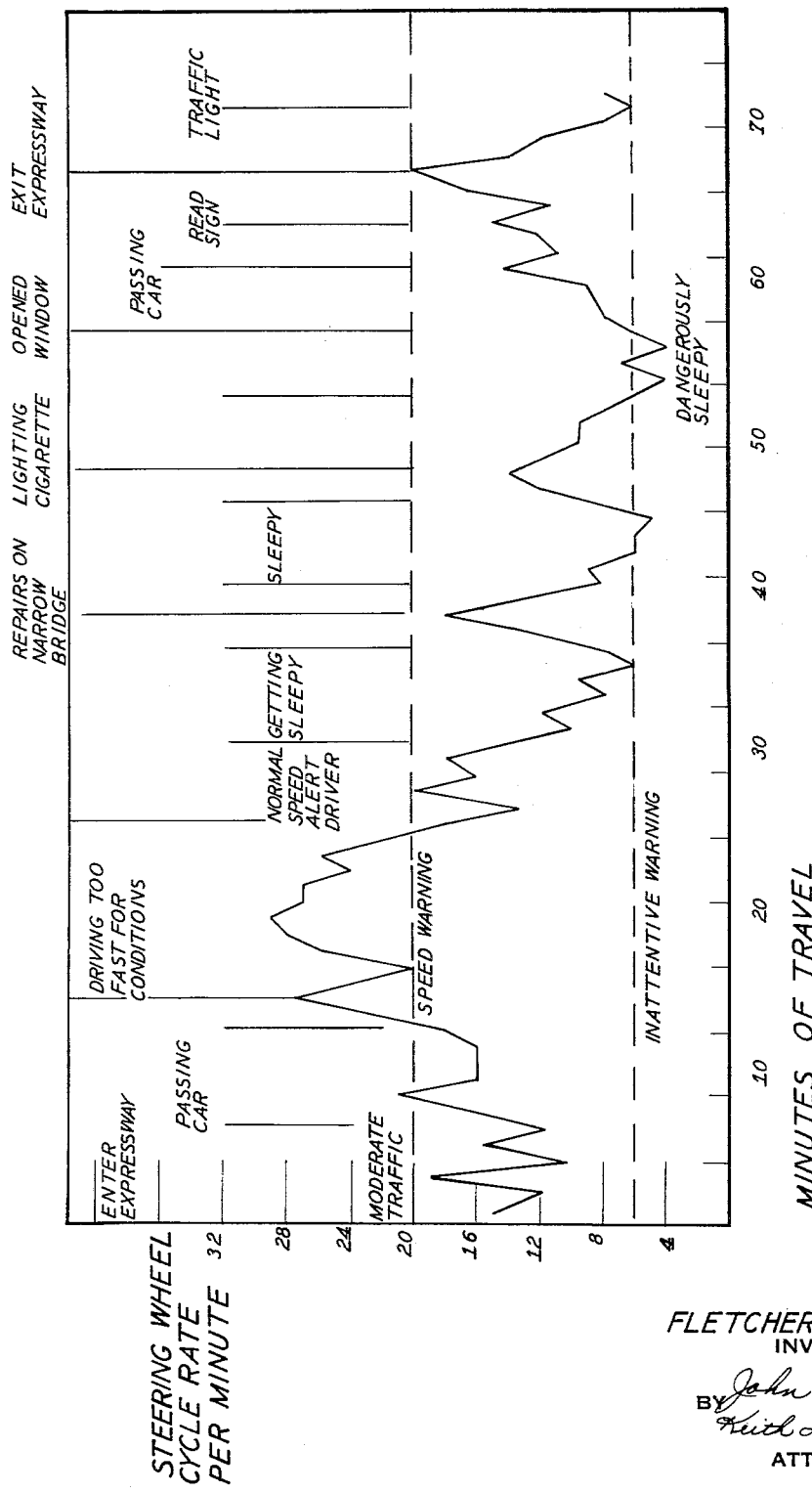
FIGURE 4 is a graph depicting a typical period of operation of the safety and training device.

The embodiment shown in FIGURE 2 has been installed in a vehicle, and experiments utilizing the system have been conducted. FIGURE 4 graphically shows the results from one of these experimental runs. During the experimental run, the data collector noted various physical events that occurred during the trip along the expressway. These events are noted on FIGURE 4. The visual inspection of FIGURE 4 will clearly indicate that the invention provides a unique and useful safety device which can greatly benefit the operator of an automotive vehicle. The device has utility as a safety device, an automobile driver training device, and an operator testing device.

It will be understood that the invention is not to be limited to the exact construction and steps shown and described and that various changes and modifications may be made without departing from the spirit and scope of the invention, as defined in the appended claims.

I claim:

1. In an automotive vehicle having a steering wheel, the combination comprising: a first means for determining the rate of steering wheel reversals and a warning means for manifesting a signal perceptible to the ordinary human senses when the said rate of steering wheel reversals exceeds a first predetermined value or becomes less than a second smaller predetermined value, which predetermined values are abnormal with respect to safe driving conditions, said warning means operatively coupled to said first means.

2. In a safety device for an automotive vehicle, the combination comprising: a vehicle steering member, a switching means for generating a signal when said vehicle steering member experiences a reversal in direction, said switching means operatively coupled to said vehicle steering member, a pulse generator means for generating a pulse when said switching circuit means generates a signal, said pulse generator means operatively coupled to said switching means, a rate means for generating a signal proportional to the rate at which pulses are generated by said pulse generator means, said rate means operatively connected to said pulse generator means, and an indicating means operatively coupled to said rate means for manifesting a perceptible signal when the rate at which pulses are generated by said pulse generator means exceeds a first predetermined value or falls below a second smaller predetermined value which predetermined values are abnormal with respect to safe driving conditions.

3. In an automotive vehicle having a steering wheel, a safety device comprising means operatively coupled to the steering wheel for determining the rate of steering wheel reversals over a substantial range of rates from and including an abnormally low rate to and including an abnormally high rate as determined by vehicle driver characteristics and means coupled to said first means for reading out and displaying instantaneously any reversal rate value within said substantial range of rates.

4. In an automotive vehicle having a steering wheel, a safety device comprising means operatively coupled to the steering wheel for determining continuously the rate of small corrective steering wheel adjustments over a substantial range of rates from and including an abnormally low rate to and including an abnormally high rate as determined by vehicle operator driving characteristics, and means coupled to said first means for reading out and displaying continuously said rate of steering wheel adjustments at any and all rates within said substantial range of rates.

5. In an automotive vehicle having a steering wheel, a safety device comprising means operatively coupled to said steering wheel for sensing the rate of steering wheel reversals over a wide range of rates, and means coupled to said first mentioned means for setting a vehicle driver's normal reversal range into said safety device and for generating a warning signal when the driver's reversal rate varies substantially either above or below said normal reversal range.

6. In a safety device for an automotive vehicle the combination comprising, a vehicle steering member, a switching means for generating a signal when said vehicle steering member experiences a reversal in direction, said switching means operatively coupled to said vehicle steering member, a pulse generator means for generating a pulse when said switching circuit means generates a signal, said pulse generator means operatively coupled to said switching means, a rate means for generating a signal proportional to the rate at which pulses are generated by said pulse generator means, said rate means operatively connected to said pulse generator means, and an indicating means operatively coupled to said rate means for reading out and displaying continuously the rate of reversals of said vehicle steering member as represented by the signal generated by said rate means.

7. In a safety device for an automotive vehicle the combination comprising, a vehicle steering member having a ring fixed on its periphery, a switching circuit means for generating a voltage when said vehicle steering member experiences a reversal in direction, said switching circuit means including a switch having a pair of contacts and an actuating member riding on said ring and connected to said contacts to close said contacts when said steering member experiences a change in direction, a pulse generator circuit means for generating a pulse when said switching circuit means generates a voltage, said pulse generator circuit means in circuit with said pair of contacts of said switching circuit means, a rate circuit means for generating a signal proportional to the rate at which pulses are generated by said pulse generator circuit means, said rate circuit means in circuit with said pulse generator circuit means, and an indicating means manifesting a perceptible signal, said indicating means operatively coupled to said rate circuit means.

8. In a safety device for an automotive vehicle the combination comprising, a vehicle steering member, a switching circuit means for generating a voltage when said vehicle steering member experiences a reversal in direction, said switching circuit means operatively coupled to said vehicle steering member, pulse generator circuit means for generating a pulse when said switching circuit means generates a voltage, said pulse generator circuit means comprising a time delay relay for generating a pulse having a constant duration, said time delay relay means in circuit with said switching circuit means and a switching means for breaking the circuit connection between the switching circuit means and said time delay relay means when a pulse is generated by said time delay relay means, said switching means in circuit with said time delay relay means and said switching circuit means, a rate circuit means for generating a signal proportional to the rate at which pulses are generated by said pulse generator circuit means, said rate circuit means in circuit wtih said pulse generator means, and an indicating means manifesting a perceptible signal, said indicating means operatively coupled to said rate circuit means.

9. In a safety device for an automotive vehicle the combination comprising, a vehicle steering member, a switching circuit means for generating a voltage when said vehicle steering member experience a reversal in direction, said switching circuit means operatively coupled to said vehicle steering member, a pulse generator circuit means for generating a pulse when said switching circuit means generates a voltage, said pulse generator circuit means comprising a make-break switch having its contacts arranged to complete a circuit for a selected period and then break the circuit when operated, and a relay coil means for operating the make-break contacts, said relay coil means operatively coupled to said made-break contacts and in circuit with said switching circuit, a rate circuit means for generating a signal proportional to the rate at which pulses are generated by said pulse generator circuit means, said rate circuit means in circuit with the make-break contacts of said pulse generator circuit means, and an indicating means manifesting a perceptible signal, said indicating means operatively coupled to said rate circuit means.

10. In a safety device for an automotive vehicle the combination comprising, a vehicle steering member, a switching circuit means for generating a voltage when said vehicle steering member experiences a reversal in direction, said switching circuit means operatively coupled to said vehicle steering member, a pulse generator circuit means for generating a pulse when said switching circuit means generates a voltage, said pulse generator circuit means in circuit with said switching circuit means, a rate circuit means for generating a signal proportional to the rate at which pulses are generated by said pulse generator circuit means, said rate circuit means comprising a heater coil in circuit with said pulse generator circuit means, a bimetal located adjacent said heater coil, and a pair of contacts located to make contact with said bimetal when said bimetal experiences a selected deflection, an indicating means manifesting a perceptible signal, said indicating means connected to said contacts of said rate circuit means.

11. In a safety device for an automotive vehicle the combination comprising, a vehicle steering member, a switching circuit means for generating a voltage when said vehicle steering member experiences a reversal in direction, said switching circuit means operatively coupled to said vehicle steering member, a pulse generator circuit means for generating a pulse when said switching circuit means generates a voltage, said pulse generator circuit means in circuit with said switching means, a rate circuit means for generating a signal proportional to the rate at which pulses are generated by said pulse generator means, said rate circuit means comprising a charging resistor in circuit with said pulse generator circuit means, a capacitor in circuit with said charging resistor and a discharging resistor connected in parallel with said capacitor, and an indicating means manifesting a perceptible signal, said discharging resistor in circuit with said indicating means.

12. In a safety device for an automotive vehicle the combination comprising, a vehicle steering member having an actuating means fixed on its periphery, a switching circuit means for generating a voltage when said vehicle steering member experiences a reversal in direction, said switching circuit means including a switch having a pair of contacts and an actuating finger riding on said actuating means, said actuating finger connected to said contacts to close said contacts when said vehicle steering member experiences a reversal in direction, a pulse generator circuit means for generating a substantially constant width pulse when said switching circuit means generates a voltage, said pulse generator circuit means in circuit with said pair of contacts of said switching circuit means, an averaging circuit means for generating a signal proportonal to the rate at which pulses are generated by said pulse generator circuit means, said averaging circuit means in circuit with said pulse generator circuit means, and an indicating means manifesting a perceptible signal, said indicating means operatively coupled to said averaging circuit means.

13. The structure defined in claim 12 wherein the pulse generator circuit means has a time delay relay for generating a pulse having a constant duration, said time delay relay means in circuit with said switching circuit means and a switching means for breaking the circuit connection between the switching circuit means and said time delay relay means when a pulse is generated by said time delay relay means, and said switching means in circuit with said time delay relay means and said switching circuit means.

14. The structure defined in claim 13 wherein said averaging circuit means comprises, a heater coil in circuit with said pulse generator circuit means, a bimetal located adjacent said heater coil, and a pair of contacts located to make contact with said bimetal when said bimetal experiences a selected deflection, said contacts connected to said indicating means.

References Cited by the Examiner

UNITED STATES PATENTS

| | | | |
|---|---|---|---|
| 2,848,712 | 8/1958 | Preston | 340—279 |
| 2,875,430 | 2/1959 | Kayser | 340—279 |
| 2,963,694 | 5/1959 | Baron | 340—62 |
| 3,106,981 | 10/1963 | Chakiris | 180—82 |

THOMAS B. HABECKER, *Acting Primary Examiner.*

NEIL C. READ, *Examiner.*